Oct. 25, 1932.    I. J. LOWDER    1,884,018
BRUSH FOR WASHING AUTOMOBILES
Filed March 4, 1932
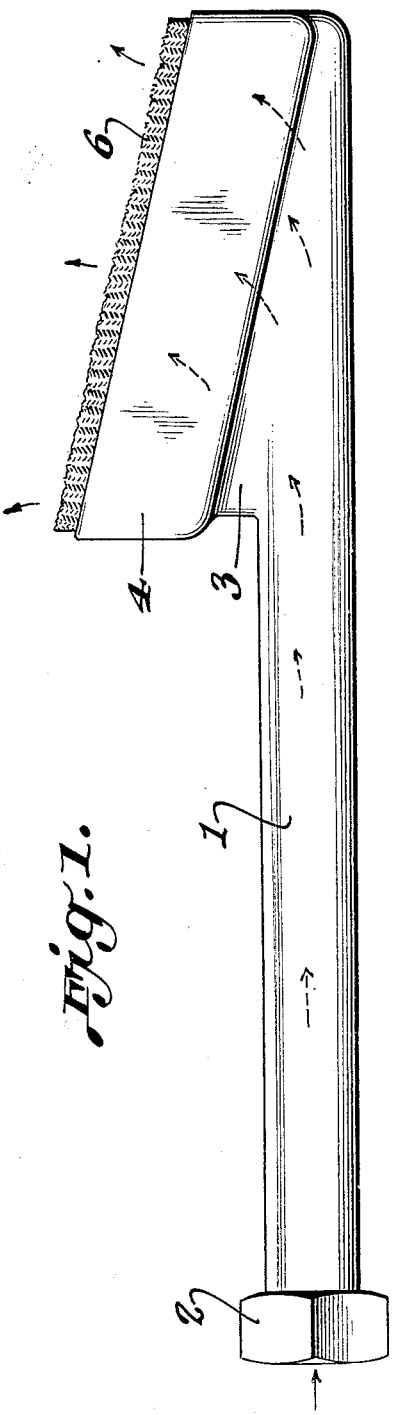
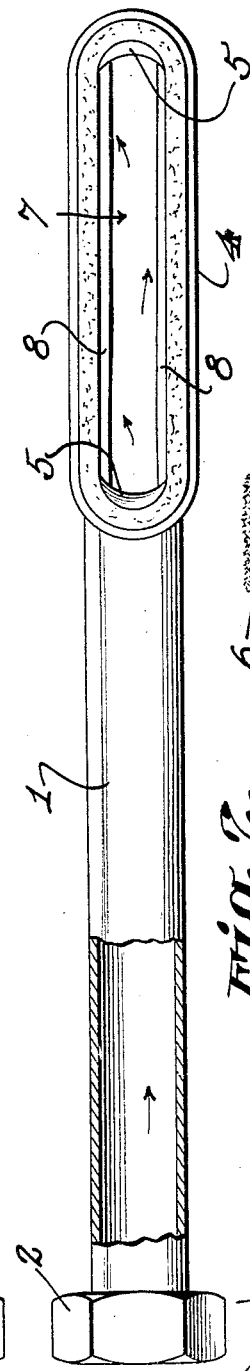
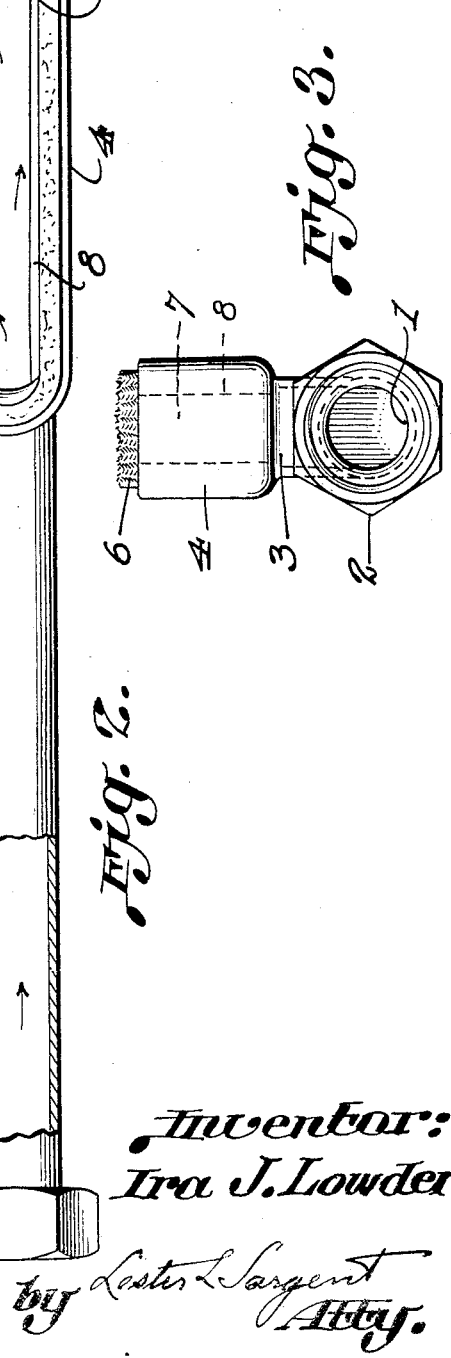
Inventor:
Ira J. Lowder
by Lester L. Sargent
Atty.

Patented Oct. 25, 1932

1,884,018

UNITED STATES PATENT OFFICE

IRA J. LOWDER, OF CHARLOTTE, NORTH CAROLINA

BRUSH FOR WASHING AUTOMOBILES

Application filed March 4, 1932. Serial No. 596,866.

The object of my invention is to provide a novel brush of the fountain brush type for washing automobiles; to provide a brush of this character of the most convenient shape and arrangement for cleaning automobiles; to provide a novel brush element in such a brush; to provide novel means for holding same in place; to provide a novel positioning of the brush; and to provide means for readily attaching the device to and detaching it from a hose; and particularly to provide the novel combination of these elements disclosed in the accompanying drawing and hereinafter described. I attain these and other objects of my invention by the mechanism illustrated in the accompanying drawing, in which—

Figure 1 is a side element of my fountain brush;

Fig. 2 is a top plan view of my invention, a portion of the handle being broken away and shown in section; and Fig. 3 is an end elevation of the device.

Like numerals designate like parts in each of the several views.

Referring to the accompanying drawing, I provide a hollow handle 1, of convenient size and length to be readily grasped, the handle preferably being about 18 inches in length, and having a hose coupling 2 mounted on the end for conveniently attaching the device to a hose. The handle 1 has an offset portion 3 on which the brush holder 4 is mounted at an angle to the handle 1, substantially as shown in Fig. 1 of the drawing, whereby the water flowing through the handle 1 and opening 7 of the brush will be diverted away from the person of the operator. I provide a flange or inner rim 8 to provide a chamber in which the wicking 6 is mounted, this wicking constituting the brush element. The wicking 6 is held in place by the reversely turned flanges 5 on inner wall or rim 8, as shown in Fig. 2.

The operation of the brush will be readily understood by referring to the drawing. The coupling 2 is used to secure the handle 1 to a hose. Water flows through the handle, as indicated by the arrows, and up through the passage 7. The water loosens mud on the automobile while the brush element 6 cleans it off efficiently. The offset position of the brush holder 4 relative to the handle is advantageous in preventing splashing of the water on the operator and also in permitting of more convenient access to various parts of the car in washing same. The wicking 6 is secured in place by stretching it over the end flanges 5.

What I claim is:

An automobile cleaning device of the type described, having in combination a hollow handle, means for attaching the handle to a hose, an open channeled holder for a wicking element, said holder consisting of spaced rims, the inner rim having reversely bent end flanges, and a wicking constituting the cleaning element and adapted to be stretched to place it over the reversely bent end flanges and between the aforesaid rims, an offset aperture member carrying the aforesaid channeled holder and in open communication with the hollow handle to permit water to flow to the wicking.

IRA J. LOWDER.